(12) United States Patent
Fouzar et al.

(10) Patent No.: US 12,449,834 B2
(45) Date of Patent: Oct. 21, 2025

(54) TRIGGERING AN ERROR DETECTOR ON RISING AND FALLING EDGES OF CLOCK SIGNALS, AND GENERATING AN ERROR SIGNAL THEREFROM

(71) Applicant: Microchip Technology Incorporated, Chandler, AZ (US)

(72) Inventors: Youcef Fouzar, Ottawa (CA); Waleed El-halwagy, Ottawa (CA); William Roberts, Highland, UT (US); Kristopher Kshonze, Ottawa (CA); Faizal Warsalee, Sittsville (CA)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/333,827

(22) Filed: Jun. 13, 2023

(65) Prior Publication Data

US 2024/0004420 A1 Jan. 4, 2024

Related U.S. Application Data

(60) Provisional application No. 63/367,581, filed on Jul. 1, 2022.

(51) Int. Cl.
*G06F 1/12* (2006.01)
*G06F 1/10* (2006.01)

(52) U.S. Cl.
CPC . *G06F 1/12* (2013.01); *G06F 1/10* (2013.01)

(58) Field of Classification Search
CPC .................................... G06F 1/12; G06F 1/10
See application file for complete search history.

(56) References Cited

U.S. PATENT DOCUMENTS 7,592,847 B2 * 9/2009 Liu ..................... H03L 7/0895
327/12
10,511,312 B1 * 12/2019 Pastorello ............... H03L 7/081

FOREIGN PATENT DOCUMENTS

CN 102231628 A 11/2011

OTHER PUBLICATIONS

Lin. "An Agile VCO Frequency Calibration Technique for a 10-GHZ CMOS PLL" IEEE Journal of Solid-State Circuits, vol. 42, No. 2, pp. 340-349 (Year: 2007).*

(Continued)

*Primary Examiner* — Terrell S Johnson
(74) *Attorney, Agent, or Firm* — TraskBritt (57) ABSTRACT

One or more examples relate to triggering a single error detector on rising and falling edges of clock signals, and generating an error signal therefrom. A method may include receiving a first clock signal and a second clock signal. The method may include generating, via a single error detector being triggered at least partially responsive to like respective edges of the first clock signal and the second clock signal, an error signal that represents a phase difference between the first clock signal and the second clock signal.

16 Claims, 7 Drawing Sheets

(56) References Cited

OTHER PUBLICATIONS

International Search Report for International Application No. PCT/US2023/068338, mailed Sep. 28, 2023, 6 pages.
International Written Opinion for International Application No. PCT/US2023/068338, mailed Sep. 28, 2023, 7 pages.
Song Ying et al., "A novel calibration technique applying to an adaptive-bandwidth PLL", Solid-State and Integrated-Circuit Technology, IEEE, IEEE 9th Internatioanl Conference, Piscataway, NJ, USA, Oct. 20, 2008, pp. 1933-1936.
Tsung-Hsien Lin et al., "An Agile VCO Frequency Calibration Technique for a 10-GHz CMOS PLL", IEEE Journal of Solid-State Circuits, vol. 42, No. 2, Feb. 1, 2007, pp. 340-349.

* cited by examiner

TRIGGERING AN ERROR DETECTOR ON RISING AND FALLING EDGES OF CLOCK SIGNALS, AND GENERATING AN ERROR SIGNAL THEREFROM

CROSS-REFERENCE TO RELATED APPLICATIONS

This application claims the benefit under 35 U.S.C. § 119(e) of the priority date of U.S. Provisional Patent Application Ser. No. 63/367,581, filed Jul. 1, 2022, for DUAL EDGE PFD CIRCUIT, AND CLOCK GENERATION CIRCUIT INCLUDING THE SAME, the contents and disclosure of which is incorporated herein in its entirety by this reference.

FIELD

One or more examples relate, generally, to error detection, including phase and frequency error detection. One or more examples relate, generally, to triggering an error detector on rising and falling edges of clock signals. One or more examples relate, generally, to clock-tracking utilizing an error detector that triggers on rising and falling edges of clock signals.

BACKGROUND

Clock-tracking circuits such as phase locked loops and delay locked loops, are circuits utilized to track clocks and other oscillating signals. An output signal of a clock-tracking circuit is locked to the phase and frequency of a reference signal. Clock-tracking circuits are utilized in a variety of operational contexts, including when two signals having known relationships are utilized to transmit information.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, any relational term, such as "over," "under," "on," "underlying," "upper," "lower," without limitation, is used for clarity and convenience in understanding the disclosure and accompanying drawings and does not connote or depend on any specific preference, orientation, or order, except where the context clearly indicates otherwise.

In this description the term "coupled" and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning unless expressly indicated otherwise or the context would indicate otherwise to a person having ordinary skill in the art.

A clock signal or just a "clock," is a signal that oscillates between a high state and a low state in a reliably predictable manner. One or more circuits can be responsive to a rising or falling edge of a clock to coordinate its actions. A change of a clock signal from a low state to a high state is referred to herein as a "rising edge," and a change of a clock signal from a high state to a low state is referred to herein as a "falling edge."

An error detector is a circuit (digital or analog) that compares the phase of two input signals and generates an output signal proportional to the phase difference between the two input signals. A phase-frequency detector (PFD) is an error detector that generates an output signal proportional to the phase difference between two input signals, and derivatively proportional to the frequency difference between the two input signals. Here, "derivatively proportional" means that information about frequency difference may be derived from information about phase difference in the error signal. The magnitude and direction of the output signal of a PFD are directly proportional to the difference in phase, and derivatively proportional to the difference in frequency, between the two input signals. In applications where phase and frequency difference is unwanted, the output signal is typically referred to as an "error signal."

A typical PFD is rising-edge triggered or falling-edge triggered, but not both rising-edge triggered and falling-edge triggered. To utilize rising and falling edges of input clock signals, two PFDs are typically utilized: one triggered by rising-edges, the other triggered by falling-edges. Alternatively, both PFDs may be rising or falling edge triggered, and one of the PFDs receives a non-inverted version of the input clock signals, and the other one of the PFDs receives an inverted version of the input clock signals. In either case, two PFDs are utilized.

Ideally, the two PFDs are perfectly matched at least in terms of: rise and fall times, input to output delay (also called "response time"), layout, output load, and non-idealities (e.g., non-idealities that result from the from fabrication process, without limitation). In practice, the inventors of this disclosure appreciate that the two PFDs will be mismatched, which reduces the performance of the PFDs, and more specifically, the usefulness of the output signals they generate. Reduced performance may lead to a variety of drawbacks based on the operational context. As a non-limiting examples, PFDs are utilized in clock-tracking circuits to generate an error signal that represent the phase and frequency difference between a reference clock signal and an output clock signal generated by the clock-tracking circuit to track the reference clock signal. Reduced performance of phase-frequency detection due to mismatch between the rising-edge triggered and falling-edge triggered PFDs may result in degraded jitter and spur performance of the output clock.

Additional circuits may be included to correct for the effects of mismatched PFDs, but that increases complexity and cost.

As used herein, the phrase "phase or frequency difference" means "phase difference or a phase and frequency difference" unless explicitly stated otherwise.

The inventors of this disclosure appreciate the desirability of error detection, such as phase-frequency detection, without limitation, based on rising edges and falling edges of input clock signals without the reduced performance due to mismatch exhibited by rising-edge triggered and falling-edge triggered PFDs utilized to perform the same.

Figure 1:
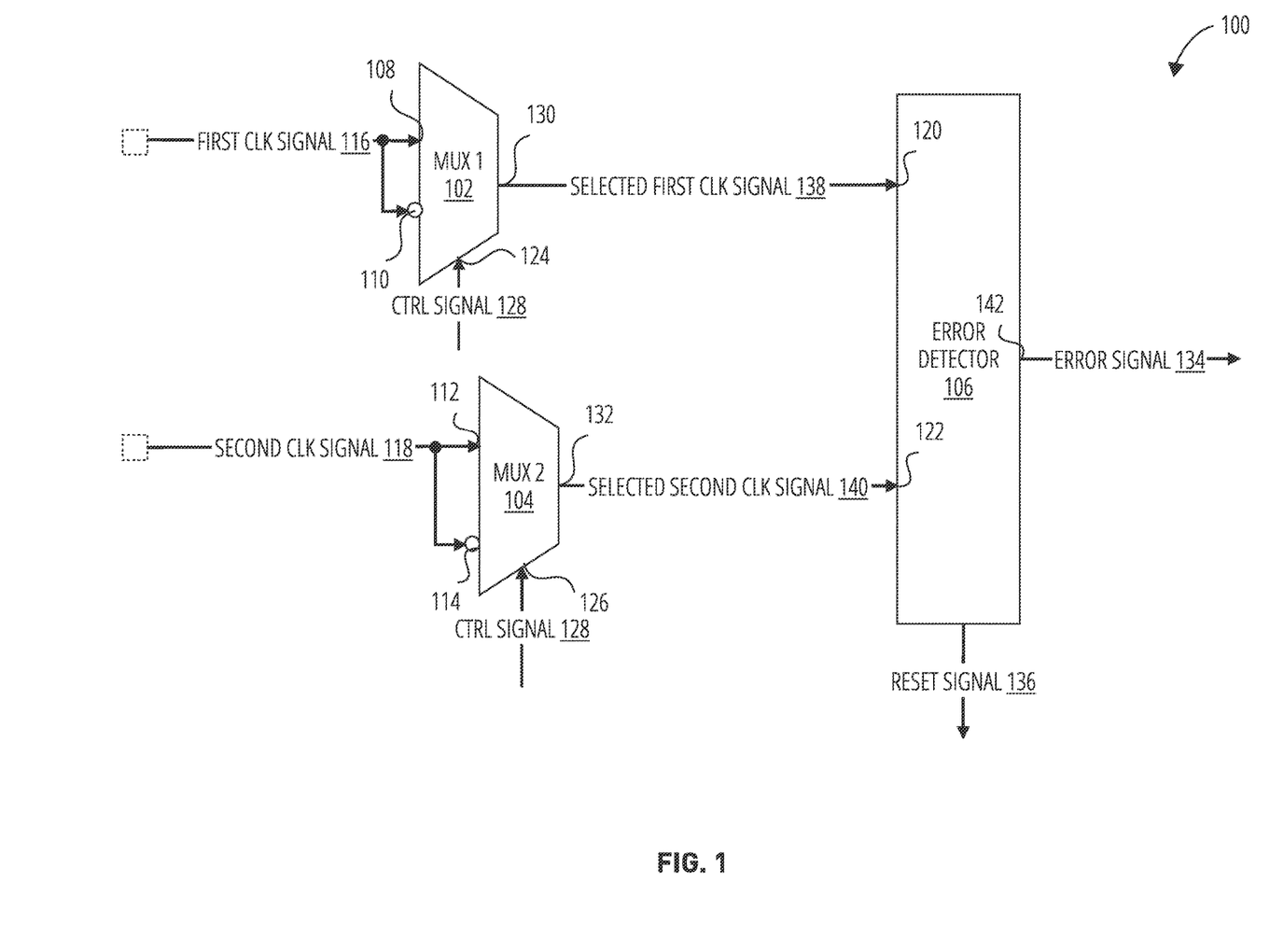
FIG. 1 is a block diagram depicting a dual-edge error detection circuit, in accordance with one or more examples.

FIG. 1 is a block diagram depicting an apparatus 100, in accordance with one or more examples. FIG. 1 is a non-limiting example of a dual-edge error detector, and may also be referred to herein as a "dual-edge error detector 100" or a "dual-edge error detection circuit 100."

Apparatus 100 includes a first multiplexer 102, a second multiplexer 104, and an error detector 106. First multiplexer 102 ("MUX 1") includes a non-inverting input 108, an inverting input 110, an output 130, and a select input 124. Second multiplexer 104 ("MUX 2") includes a non-inverting input 112, an inverting input 114, an output 132, and a select input 126. Error detector 106 includes a first input 120, a second input 122, and an output 142.

First multiplexer 102/second multiplexer 104 respectively select one of a signal at non-inverting input 108/non-inverting input 112 or a signal at inverting input 110/inverting input 114 at least partially responsive to a selection signal (here, control signal 128) received at select input 124/select input 126, and provides the selected signal at output 130/output 132, which are respectively coupled to input 120/input 122 of error detector 106.

Error detector 106 generates an error signal 134 that is proportional to the phase difference, and derivatively proportional to the frequency difference, between the two input-selected signals provided at output 130 of first multiplexer 102 and output 132 of second multiplexer 104. Here, "derivatively proportional" means that information about frequency difference may be derived from information about phase difference. Here, the phase difference is represented by error signal 134 such that information about a frequency difference between the two input-selected signals can be derived at least partially based on error signal 134. The magnitude and direction of an error signal 134 is proportional to the phase difference (and derivatively proportional to the frequency difference) between the two input-selected signals—here, the versions (i.e., inverted or non-inverted, as the case may be) of first clock signal 116 and second clock signal 118 received at input 120/input 122. Error detector 106 may include or be, as non-limiting examples, a phase detector, or a time-to-digital converter.

In one or more examples, an output of error detector 106 may be provided to an input of a bang-bang phase detector that generates increment (INC) and decrement (DEC) signals that indicate information about phase difference between two input-selected signals, but not about frequency difference.

In one or more examples, if the respective phases of the two input-selected signals are substantially the same, the magnitude and direction of an error signal 134 generated by error detector 106 will be zero, indicating that the phase and frequency of the two input-selected signals are the same. In one or more examples, if the respective phases of the two input-selected signals are different, then the magnitude and direction of an error signal 134 generated by error detector 106 will be non-zero, and proportional to such difference.

Error detector 106 is edge triggered, and resets upon detecting like respective edges of two input-selected signals. In various examples, error detector 106 may be rising-edge triggered or falling-edge triggered—i.e., triggered by respective rising edges or respective falling edges of the two input-selected signals: selected first clock signal 138 and selected second clock signal 140. In various examples, apparatus 100 may be rising-edge triggered or falling-edge triggered—i.e., triggered by respective rising edges or respective falling edges of first clock signal 116 and second clock signal 118. As non-limiting examples, error signal 134 generated by error detector 106 may be a voltage signal, a current signal, or two binary signals.

In the case of a voltage or current signal, a positive value of error signal 134 indicates that the phase of one of the input-selected signals leads the other (in terms of time), and a negative value of error signal 134 indicates that the phase of one of the input signals lags the other (in terms of time). The magnitude of error signal 134 (e.g., amplitude, without limitation) indicates the amount of phase difference between the signal received at first input 120 and the signal received at the second input 122. A larger magnitude error signal indicates a larger phase difference between the two input-selected signals, and a smaller magnitude error signal indicates a smaller phase difference.

In the case of two binary signal, error signal 134 may include two signals, an UP signal and a DOWN signal. Error detector 106 generates the UP signal and the DOWN signal as a series of pulses, where pulses on respective ones of the UP signal and DOWN signal indicate the magnitude and direction of error signal 134. The one of the UP signal and the DOWN signal that first exhibits a pulse indicates which one of the two input-selected signals leads the other; and, conversely, which one of the two input-selected signals lags the other. The magnitude of error signal 134 is represented by the pulse width of a pulse generated in the UP signal or DOWN signal. A larger pulse width indicating a larger phase difference between the two input signals, and a smaller pulse width indicating a smaller phase difference. One of the inputs of error detector 106 is preset as the reference input that is led, lagged, or locked to, and the other one of the inputs of error detector 106 is preset as the feedback (or "controlled") input that is leading, lagging, or locked on. As a non-limiting example, in a clock-tracking circuit the reference signal is provided to the reference input, and the output signal is provided to the feedback input.

First multiplexer 102 receives first clock signal 116 at its non-inverting input 108 and inverting input 110, and receives control signal 128 at its select input 124. First multiplexer 102 selects one of non-inverting input 108 and inverting input 110 at least partially responsive to control signal 128, and provides one of an inverted or non-inverted version of first clock signal 116 at its output 130 as selected first clock signal 138 at least partially responsive to control signal 128.

Second multiplexer 104 receives second clock signal 118 at its non-inverting input 112 and inverting input 114 and receives control signal 128 at its select input 126. First multiplexer 102 selects one of non-inverting input 112 or inverting input 114 at least partially responsive to control signal 128, and provides one of an inverted or non-inverted version of second clock signal 118 at its output 132 as selected second clock signal 140 at least partially responsive to control signal 128. In one or more examples, first clock signal 116 and second clock signal 118 are different clock signals.

Output 130 of first multiplexer 102 is coupled to first input 120 of error detector 106 and output 132 of second multiplexer 104 is coupled to second input 122 of error detector 106. Error detector 106 generates error signal 134 to represent the phase and frequency difference between selected first clock signal 138 and selected second clock signal 140.

As discussed above, error detector 106 may be either rising-edge triggered or falling-edge triggered. If rising-edge triggered, error detector 106 ignores falling-edges. If falling-edge triggered, error detector 106 ignores rising edges.

As will be described below, in one or more examples, first multiplexer 102 and second multiplexer 104 are controlled via control signal 128 to provide inverted or non-inverted versions of first clock signal 116 and second clock signal 118 as selected first clock signal 138 and selected second clock signal 140, respectively.

As a non-limiting example, after error detector 106 triggers on a rising-edge of a non-inverted version of first clock signal 116 and a rising-edge of a non-inverted version of second clock signal 118, first multiplexer 102 and second multiplexer 104 are controlled via control signal 128 to select their respective inverting inputs 110/114. Upon selecting their inverting inputs, first multiplexer 102 provides an inverted version of first clock signal 116 as selected first clock signal 138 to first input 120 of error detector 106, and second multiplexer 104 provides an inverted version of second clock signal 118 as selected second clock signal 140 to second input 122 of error detector 106.

Error detector 106 resets upon detecting the same respective edges of the signals at first input 120 and second input 122 (here, selected first clock signal 138 and selected second clock signal 140), and asserts reset signal 136. After reset, error detector 106 triggers on the rising edge of selected first clock signal 138 (the inverted version of first clock signal 116) and the rising edge of selected second clock signal 140 (the inverted version of second clock signal 118). By alternatingly providing the inverted and non-inverted versions of first clock signal 116 and second clock signal 118 to error detector 106 as selected first clock signal 138 and selected second clock signal 140, respectively, dual-edge error detector 100 reuses error detector 106 for rising edges and falling edges of clock signals, and apparatus 100 operates as a dual-edge triggered error detector, and more specifically, a dual-edge triggered phase-frequency detector, as discussed in more detail, below.

Figure 2:
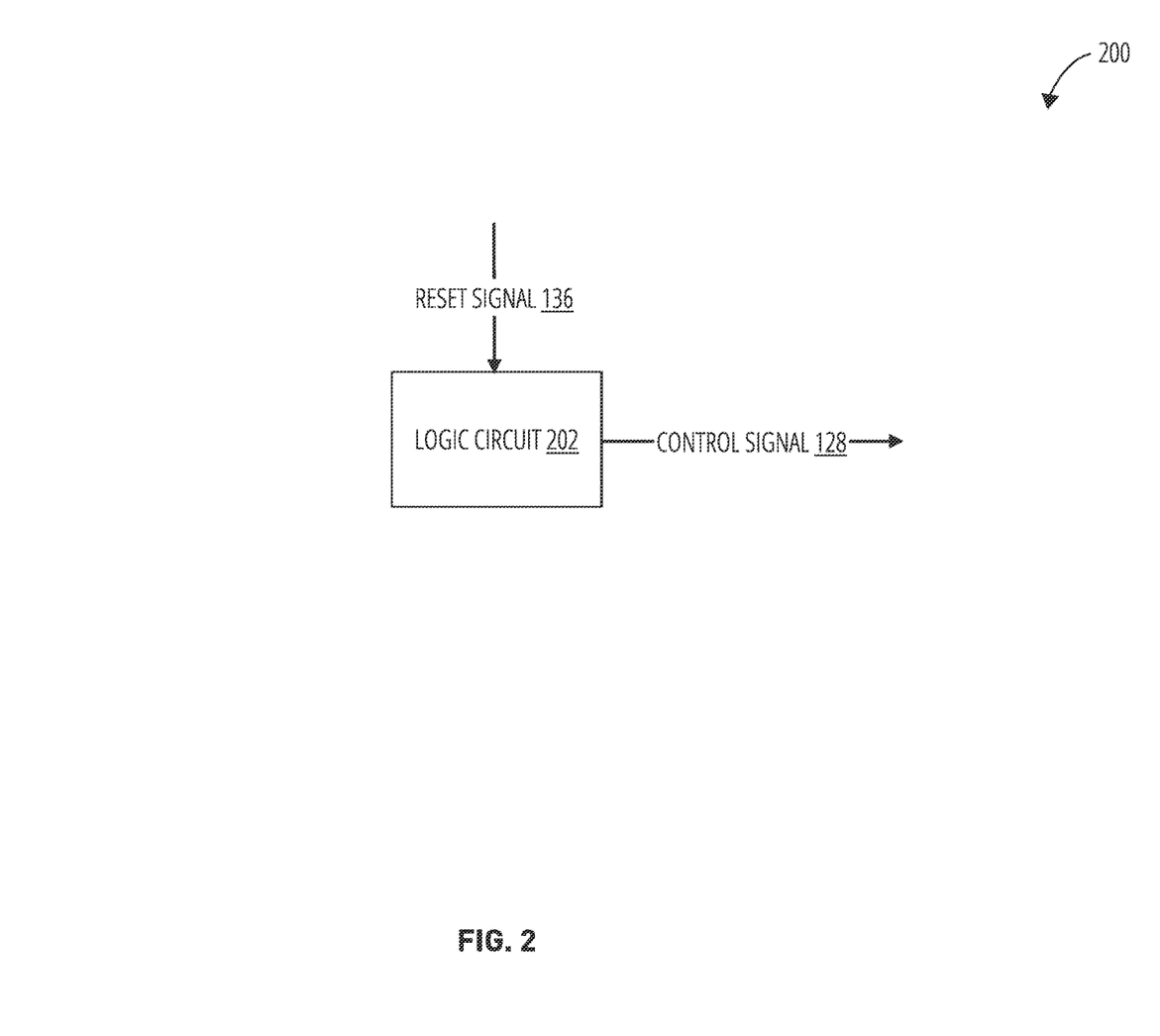
FIG. 2 is a block diagram depicting a logic circuit to generate control signals, and control a first multiplexer and a second multiplexer for dual-edge triggering at the dual-edge error detection circuit of FIG. 1, in accordance with one or more examples.

FIG. 2 is a block diagram depicting an apparatus 200 to generate a control signal 128 of FIG. 1, and control first multiplexer 102 and second multiplexer 104 for dual-edge triggering of apparatus 100, in accordance with one or more examples. Apparatus 200 includes logic circuit 202.

Logic circuit 202 receives reset signal 136 from error detector 106, and generates control signal 128 at least partially responsive to reset signal 136. In one or more examples, error detector 106 de-asserts reset signal 136 to indicate that error detector 106 has been edge-triggered and will trigger upon the next set of edges of input signals. Logic circuit 202 alternately asserts and de-asserts control signal 128 in response to one of de-assertions or assertions of reset signal 136. Whether logic circuit 202 asserts or de-asserts control signal 128 in response to de-assertions or assertions of reset signal 136 is an implementation decision and either can be utilized without exceeding the scope of this disclosure.

In one or more examples, first multiplexer 102 may select non-inverting input 108 upon an assertion of control signal 128 and select inverting input 110 upon a de-assertion of control signal 128, and second multiplexer 104 may select inverting input 114 upon an assertion of control signal 128 and select non-inverting inputs 112 upon a de-assertion of control signal 128. Association of inputs of first multiplexer 102 and second multiplexer 104 with assertions or de-assertions of control signal 128 is an implementation decision and any suitable association may be utilized without exceeding the scope of this disclosure.

Figure 3:
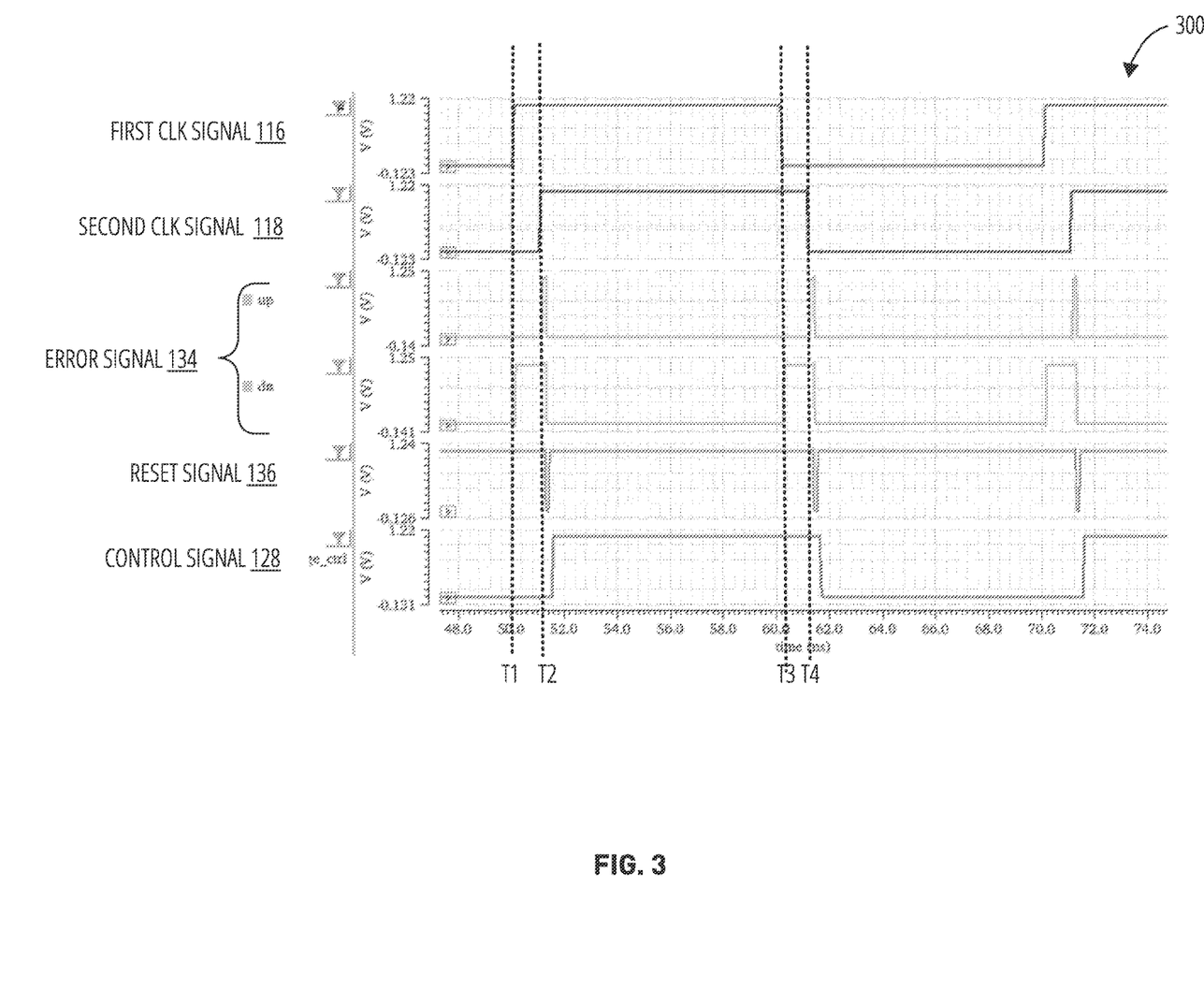
FIG. 3 is a timing diagram depicting a process in a non-limiting example operation of the dual-edge error detection circuit of FIG. 1, in accordance with one or more examples.

FIG. 3 is a signal timing diagram depicting process 300 according to a non-limiting example operation of apparatus 100, in accordance with one or more examples. The x-axis of the signal timing diagram represents time, increasing from the left toward the right of the page. The y-axis of the signal timing diagram represents voltage levels, which increasing from the bottom toward the top of the page. In the specific example operation depicted by FIG. 3, time is expressed in nanoseconds (ns).

Process 300 include first clock signal 116, second clock signal 118, control signal 128, error signal 134, and reset signal 136 of FIG. 1 and FIG. 2.

In the specific non-limiting example depicted by FIG. 3, error signal 134 includes two signals, an UP signal ("up") and a DOWN signal ("dn"), as discussed above. In the specific non-limiting example depicted by FIG. 3, the DOWN signal is asserted to indicate timing of an occurrence of an edge of first clock signal 116, and de-asserted to indicate timing of occurrence of a like edge of second clock signal 118 (e.g., before or after occurrence of the edge of first clock signal 116). If a like edge of second clock signal 118 occurred before the edge of first clock signal 116 then the DOWN signal is de-asserted after momentarily (e.g., for a predetermined time duration, where the duration indicates the order of occurrences, without limitation) holding the DOWN signal at a high state. If a like edge of second clock signal 118 occurs after the edge of first clock signal 116 then the DOWN signal is held at a high state until it is de-asserted in response to the occurrence of the like edge of second clock signal 118.

In the specific non-limiting example depicted by FIG. 3, the UP signal is asserted to indicate timing of an occurrence of an edge of second clock signal 118, and de-asserted to indicate timing of an occurrence of a like edge of first clock signal 116. If a like edge of first clock signal 116 occurred before the edge of second clock signal 118 then the UP signal is de-asserted after momentarily (e.g., for a predetermined time duration, where the duration indicates the order of occurrences, without limitation) holding the UP signal at a high state. If a like edge of first clock signal 116 occurs after the edge of first clock signal 116 then the UP signal is held at a high state until it is de-asserted in response to the occurrence of the like edge of second clock signal 118. When the two input signals are in phase, neither the UP nor DOWN signals are asserted (i.e., the UP and DOWN signals remain in a low state).

Error detector 106 generates pulses at DOWN signal of error signal 134 to indicate edges of first clock signal 116 and timing relative to like edges of second clock signal 118, and generates pulses at UP signal of error signal 134 to indicate edges of second clock signal 118 and timing relative to like edges of first clock signal 116. The larger pulse width indicates which edge leads, and the smaller pulse width indicates which edge lags. The width of the larger pulse is determined by a time difference between the edges. The width of the smaller pulse is set to a predetermined time duration.

Notably, association of the UP signal or the DOWN signal of error signal 134 with first clock signal 116 or second clock signal 118 (or the input-selected signals received at first input 120 or second input 122 of error detector 106 in FIG. 1), and relative timing thereof, is a matter of design choice (e.g., based on operating conditions, without limitation) and does not limit this disclosure in any way. As non-limiting examples, the DOWN signal may be associated with edges of first clock signal 116 and UP signal associated with edges of second clock signal 118, or the DOWN signal may be associated with edges of second clock signal 118 and UP signal associated with edges of first clock signal 116, without exceeding the scope of this disclosure.

Turning to the specific example process 300 depicted by the timing diagram shown in FIG. 3, at time T1 error detector 106 asserts the DOWN signal to indicate an edge (here a rising-edge) of first clock signal 116, while second clock signal 118 remains low. Control signal 128 is de-asserted up to time T1. At time T2, error detector 106 de-asserts DOWN signal and momentarily asserts the UP signal to indicate an edge (here a rising-edge) of second clock signal 118.

At time T2, error detector 106 momentarily asserts reset signal 136 (here, reset signal 136 is asserted active low) to indicate that error detector 106 has been edge-triggered, i.e., a rising edge has been detected for both first clock signal 116 and second clock signal 118, and that error detector 106 is ready to trigger upon the next set of edges of input signals. At time T2, apparatus 200 asserts control signal 128 in response to the momentary assertion of reset signal 136. As discussed above, the outputs of first multiplexer 102 and second multiplexer 104 switch to providing selected first clock signal 138 and selected second clock signal 140 as the other one of the inverted or non-inverted version of first clock signal 116 and second clock signal 118 in response to assertion of control signal 128.

At time T3, error detector 106 asserts the DOWN signal to indicate an edge (here a falling-edge) of first clock signal 116, while second clock signal 118 remains high. At T4, error detector 106 de-asserts the DOWN signal and momentarily asserts the UP signal to indicate an edge (here a falling-edge) of second clock signal 118.

At a time T4, error detector 106 momentarily asserts reset signal 136 to indicate that error detector 106 has been edge-triggered, i.e., a falling edge has been detected for both first clock signal 116 and second clock signal 118, and that the error detector 106 is ready to trigger upon the next set of edges of input signals. At time T4, apparatus 200 de-asserts control signal 128 in response to the momentary assertion of reset signal 136.

In the specific non-limiting example operation depicted by FIG. 3, DOWN signal and UP signal of error signal 134, and control signal 128 are described as active high (i.e., a high state when asserted and a low state when de-asserted), and reset signal 136 is described as active low (i.e., a low state when asserted and a high state when de-asserted). Whether to use active high or active low is a matter of design choice (e.g., based on operating conditions, without limitation) and does not limit this disclosure in any way. As non-limiting examples, one or more of DOWN signal and UP signal of error signal 134, control signal 128, or reset signal 136 may be set as active high or set as active low.

Figure 4:
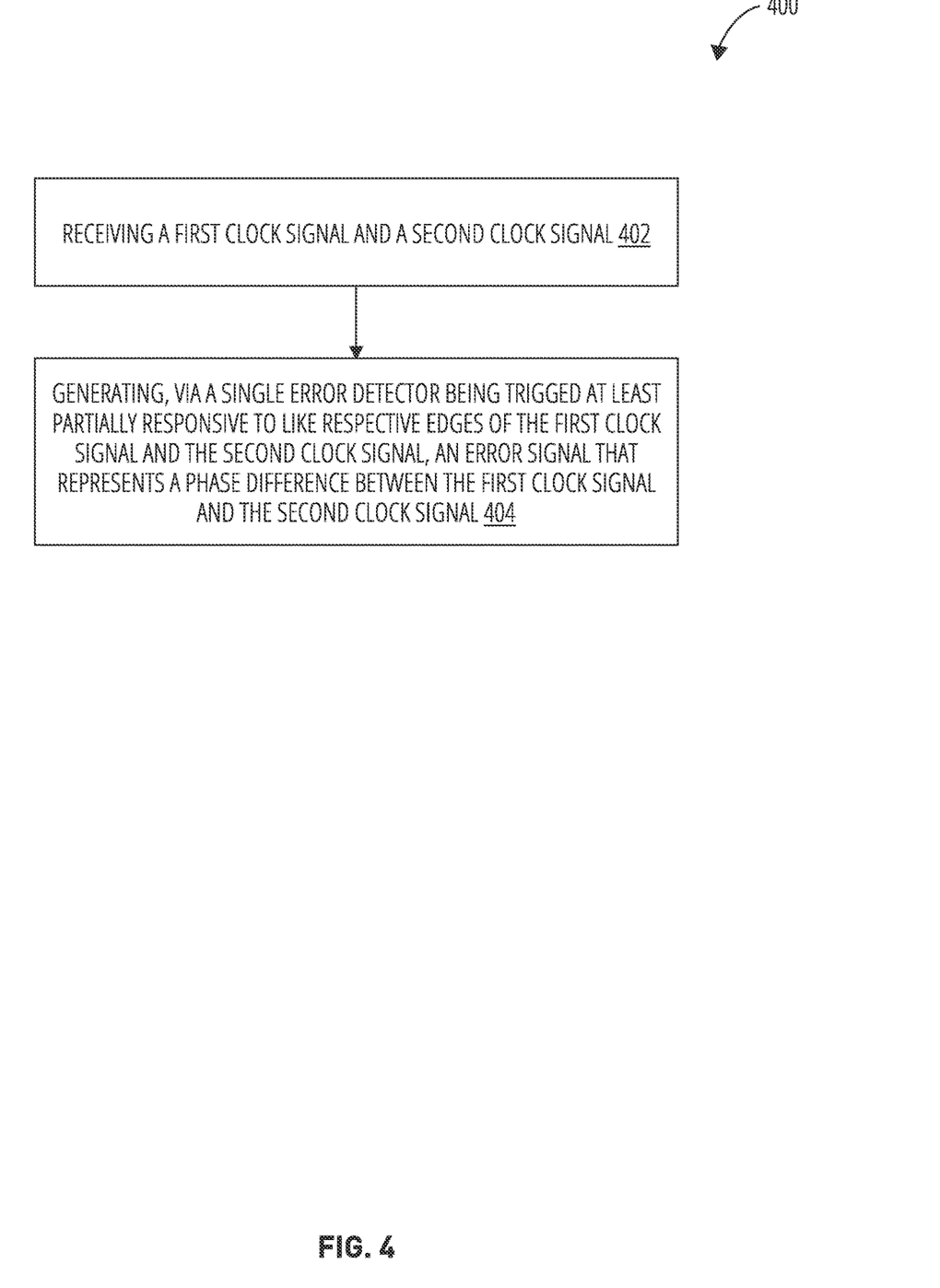
FIG. 4 is a flow diagram depicting a process to generate an error signal representing the phase difference between a first clock signal and a second clock signal, in accordance with one or more examples.

FIG. 4 is a flow diagram depicting a process 400 to generate an error signal representing the phase difference between a first clock signal and a second clock signal, in accordance with one or more examples. In one or more examples, some or a totality of operations of process 400 may be performed by a dual-edge error detection circuit 100 of FIG. 1.

Although the example process 400 depicts a particular sequence of operations, the sequence may be altered without departing from the scope of the present disclosure. For example, some of the operations depicted may be performed in parallel or in a different sequence that does not materially affect the function of the process 400. In other examples, different components of an example device or system that implements the process 400 may perform functions at substantially the same time or in a specific sequence.

In one or more examples, process 400 includes receiving a first clock signal and a second clock signal at operation 402. The first clock signal and the second clock signal are different (e.g., generated by different sources, provided via different signal paths, or both, without limitation).

In one or more examples, one of the first clock signal and the second clock signal may be a reference clock signal and the other an output clock signal (or a clock signal indicative of an output clock signal such as a feedback clock signal) generated by a clock-tracking circuit to track the reference clock signal.

In one or more examples, process 400 includes generating, via a single error detector (e.g., error detector 106, without limitation) being trigged at least partially responsive to like respective edges of the first clock signal and the second clock signal, an error signal that represents a phase difference between the first clock signal and the second clock signal at operation 404. To be triggered at least partially responsive to like respective edges of the first clock signal and the second clock signal, in the case of an apparatus 100, the single error detector is alternately provided selected ones of non-inverted and inverted versions of first clock signal and second clock signal and is alternately triggered by the selected ones of non-inverted and inverted versions of first clock signal and second clock signal, without limitation. In one or more examples, the single error detector is being triggered by a totality of like respective edges of the first clock signal and the second clock signal, which, in the case of a clock signal, means that the single error detector is being triggered by respective rising edges of the first clock signal and the second clock signal, and is being triggered by respective falling edges of the first clock signal and the second clock signal.

To trigger a single error detector (e.g., error detector 106, without limitation) in response to rising edges and falling edges of the first and second clock signals, in one or more examples, multiplexers (e.g., multiplexers 102 and 104, without limitation) may be used to alternately select non-inverted or inverted versions of the first and second clock signals and provide the respective input-selected signals to respective ones of the first and second inputs of the single error detector. A logic circuit (e.g., logic circuit 202, without limitation) may control, via one or more control signals, selection at the multiplexers of the inverted or non-inverted versions of the first and second clock signals and timing thereof.

Figure 5:
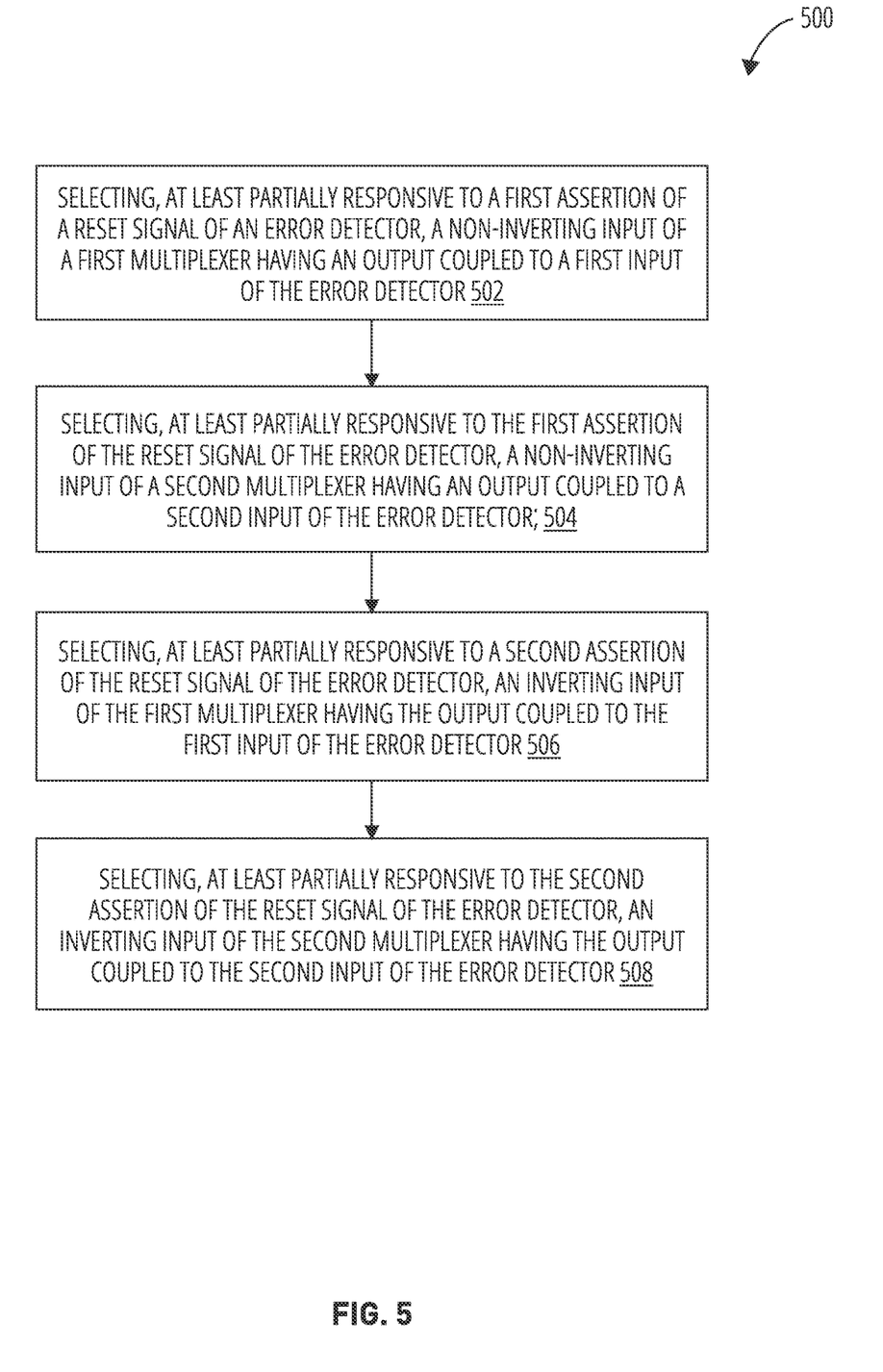
FIG. 5 is a flow diagram depicting a process to control select inputs of a first multiplexer and a second multiplexer of the dual-edge error detection circuit of FIG. 1 via a control signal, in accordance with one or more examples.

FIG. 5 is a flow diagram depicting a process 500 to control selection of inverted or non-inverted versions of the first clock signal and the second clock signal, in accordance with one or more examples. More specifically, FIG. 5 depicts a process 500 to control select inputs 124, 126 of first multiplexer 102 and second multiplexer 104 of apparatus 100, respectively, via control signal 128. In one or more examples, some or a totality of operations of process 300 may be performed by apparatus 200 of FIG. 2, multiplexers 102 and 104 of FIG. 1, or a combination thereof.

Although the example process 500 depicts a particular sequence of operations, the sequence may be altered without departing from the scope of the present disclosure. For example, some of the operations depicted may be performed in parallel or in a different sequence that does not materially affect the function of the process 500. In other examples, different components of an example device or system that implements the process 500 may perform functions at substantially the same time or in a specific sequence.

In one or more examples, process 500 includes selecting, at least partially responsive to a first assertion of a reset signal of an error detector, a non-inverting input of a first multiplexer having an output coupled to a first input of the error detector at operation 502.

In one or more examples, process 500 includes selecting, at least partially responsive to the first assertion of the reset signal of the error detector, a non-inverting input of a second multiplexer having an output coupled to a second input of the error detector at operation 504.

In one or more examples, process 500 includes selecting, at least partially responsive to a second assertion of the reset signal of the error detector, an inverting input of the first multiplexer having the output coupled to the first input of the error detector at operation 506.

In one or more examples, process 500 includes selecting, at least partially responsive to the second assertion of the reset signal of the error detector, an inverting input of the second multiplexer having the output coupled to the second input of the error detector at operation 508.

In one or more examples of process 500, one of the first and second multiplexers may be receiving the first clock signal at its non-inverted and inverted inputs, and the other one of the first and second multiplexers may be receiving the other one of the first and second clock signals at its non-inverted and inverted inputs.

In one or more examples, "selecting" in process 500 should be understood to encompasses, but not be limited to: selecting an inverting input or non-inverting input, as the case may be, at a multiplexer, generating a control signal configured to cause selection of an inverting input or non-inverting input, as the case may be, at a multiplexer, a combination thereof, and legal equivalents thereof.

Figure 6:
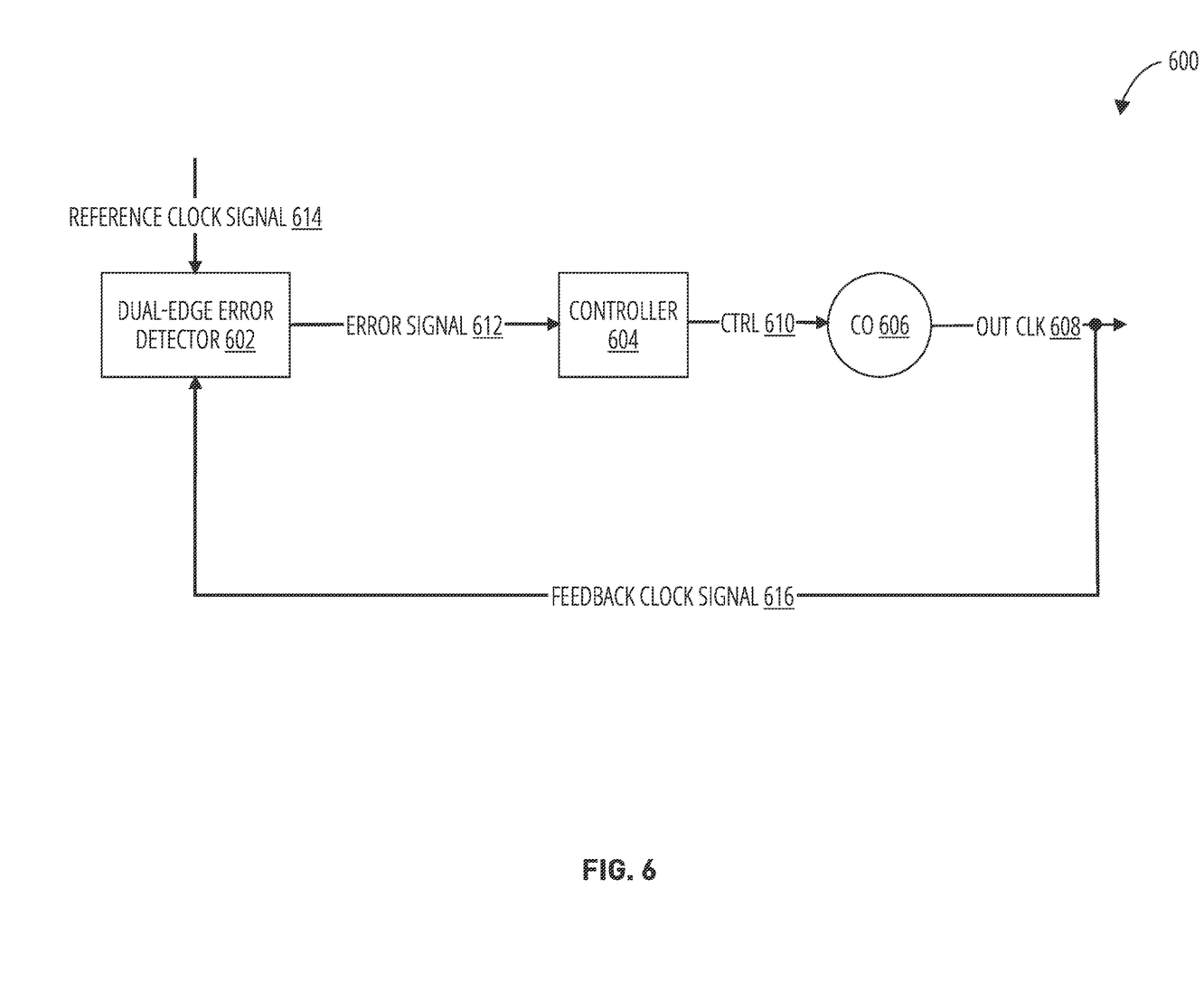
FIG. 6 is a block diagram depicting an apparatus to track a clock, in accordance with one or more examples.

FIG. 6 is a block diagram depicting an apparatus 600 to track a clock (and may also be referred to herein as a "clock-tracking circuit 600"), in accordance with one or more examples. As non-limiting examples, clock-tracking circuit 600 may be a hybrid phase locked loop (PLL), analog PLL, a digital PLL, a delay locked loop (DLL), an injection locked loop (ILL), or a frequency synthesizer.

Apparatus 600 includes a dual-edge error detector 602, a controller 604, and a controlled-oscillator 606. Apparatus 600 operates, generally, to generate an output clock signal 608 phase-locked and frequency-locked to a reference clock signal 614.

Dual-edge error detector 602 is a non-limiting example of dual-edge error detector 100 of FIG. 1. Dual-edge error detector 602 receives reference clock signal 614 and feedback clock signal 616. Generally speaking, dual-edge error detector 602 is edge triggered, and resets upon detecting a like edge of reference clock signal 614 and feedback clock signal 616. Dual-edge error detector 602 does not distinguish between rising or falling edges. Dual-edge error detector 602 reuses a single error detector to detect like edges of (rising and falling) of reference clock signal 614 and output clock signal 608. Dual-edge error detector 602 generates an error signal 612 that is proportional to the phase and frequency difference between reference clock signal 614 and feedback clock signal 616.

Reference clock signal 614 may be generated by any suitable clock source for a given operational context. Feedback clock signal 616 may be the same as output clock signal 608 (e.g., output clock signal 608 is provided directly to an input of dual-edge error detector 602, without limitation) or may be a clock signal indicative of the phase, frequency, pulse width, and duty cycle of output clock signal 608. For example, the phase, frequency, pulse width, and duty cycle of feedback clock signal 616 may be the same or different than output clock signal 608, but in either case, is relatable back to the phase, frequency, pulse width, and duty cycle of output clock signal 608. In one or more examples, feedback clock signal 616 may be a frequency divided version of output clock signal 608 (e.g., via a frequency divider or buffer, without limitation).

Controlled-oscillator 606 is an electronic oscillator for generating output clock signal 608 at least partially in response to control signal 610, which control signal 610 may be a digital control signal (i.e., in the case of a digital controlled oscillator (DCO)), a voltage control signal (i.e., in the case of a voltage controlled oscillator (VCO)), a current control signal (i.e., in the case of a current controlled oscillator (CCO)) or a combination thereof (i.e., a hybrid controlled oscillator (e.g., any combination of digital, voltage, or current controlled, without limitation)).

In the specific non-limiting example depicted by FIG. 6, apparatus 600 includes a controller 604, which provides control signal 610 to controlled-oscillator 606 to adjust output clock signal 608. Controller 604 generates control signal 610 at least partially in response to error signal 612. In one or more examples, controller 604 may include circuits (analog circuits, digital circuits, or both) to provide proportional control and integral control of controlled-oscillator 606. Controller 604 may include a proportional control path for transient correction of phase differences between feedback clock signal 616 reference clock signal 614 indicated by error signal 612. Controller 604 may include an integral control path to urge an average frequency of controlled-oscillator 606 toward a target frequency (e.g., a frequency of reference clock signal 614 or a multiple thereof, without limitation) in response to phase or frequency differences between feedback clock signal 616 and reference clock signal 614 indicated by error signal 612.

Since dual-edge error detector 602 determines phase and frequency differences of rising and falling edges of reference clock signal 614 and feedback clock signal 616, apparatus 600 may achieve dual-edge lock. In other words, apparatus 600 achieves lock in response to the phase difference between reference clock signal 614 and feedback clock signal 616 being sufficiently small (e.g., being within a predetermined threshold difference, without limitation), and the determined phase and frequency difference is at least partially based on rising and falling edges of reference clock signal 614 and feedback clock signal 616. When the phase difference between reference clock signal 614 and feedback clock signal 616 is too large (e.g., being outside a predetermined threshold difference, without limitation), apparatus 600 may be considered out-of-lock. Further, utilizing dual-edge error detector 602 in clock-tracking circuit 600 increases the proportional gain of clock-tracking circuit 600, because, in a given clock-cycle, twice as much error detection is realized than a single-edge error detector (e.g., errors with respect to each of the respective edges of the reference clock signal are detected), and twice as much phase and frequency corrections as a single-edge error detector (e.g., errors with respect to each edge of the reference clock signal are corrected, without limitation) may be realized. Further, the dual-edge error detector 602 does not have to address mismatch discussed above between multiple error detectors, such as in circuits that utilize two separate and distinct error detectors to separately detect rising and falling edges of input signals. Further, the dual-edge error detector 602 avoids complexity associated with accommodating mismatched error detectors in circuits that utilize two error detectors.

Figure 7:
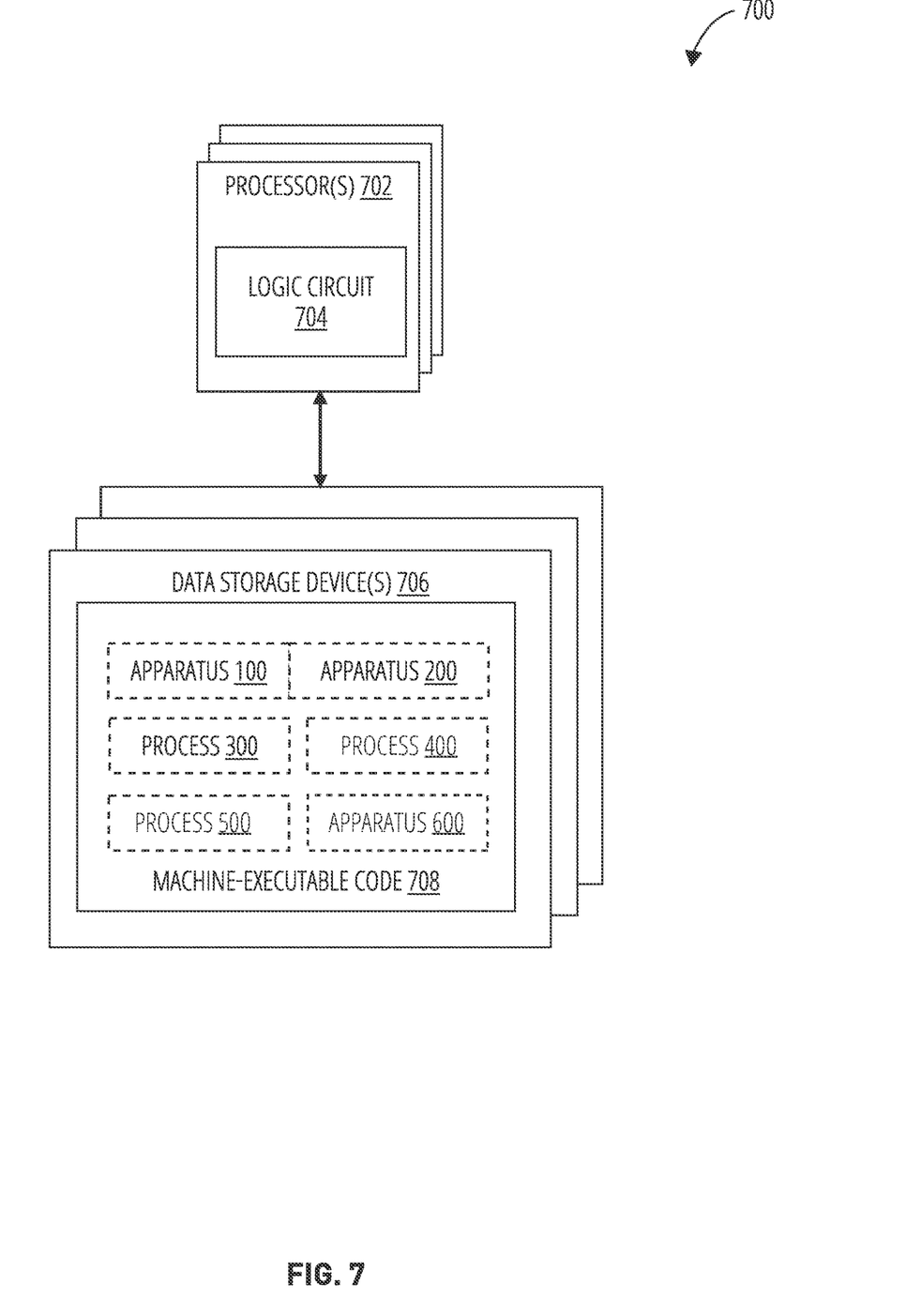
FIG. 7 is a block diagram of circuitry that, in some examples, may be used to implement various functions, operations, acts, processes, or methods disclosed herein.

It will be appreciated by those of ordinary skill in the art that functional elements of examples disclosed herein (e.g., functions, operations, acts, processes, or methods) may be implemented in any suitable hardware, software, firmware, or combinations thereof. FIG. 7 illustrates non-limiting examples of implementations of functional elements disclosed herein. In some examples, some or all portions of the functional elements disclosed herein may be performed by hardware specially for carrying out the functional elements.

FIG. 7 is a block diagram of a circuit 700 that, in some examples, may be used to implement various functions, operations, acts, processes, or methods disclosed herein. The circuit 700 includes one or more processors 702 (sometimes referred to herein as "processors 702") operably coupled to one or more data storage devices 706 (sometimes referred to herein as "storage 706"). The storage 706 includes machine-executable code 708 stored thereon and the processors 702 include logic circuit 704. The machine-executable code 708 includes information describing functional elements that may be implemented by (e.g., performed by) the logic circuit 704. The logic circuit 704 is adapted to implement (e.g., perform) the functional elements described by the machine-executable code 708. The circuit 700, when executing the functional elements described by the machine-executable code 708, should be considered as special purpose hardware for carrying out functional elements disclosed herein. In some examples the processors 702 may perform the functional elements described by the machine-executable code 708 sequentially, concurrently (e.g., on one or more different hardware platforms), or in one or more parallel process streams.

When implemented by logic circuit 704 of the processors 702, the machine-executable code 708 adapts the processors 702 to perform operations of examples disclosed herein. By way of non-limiting example, the machine-executable code 708 adapts the processors 702 to perform some or a totality of operations of one or more of process 300, process 400, or process 500.

Also by way of non-limiting example, the machine-executable code 708 may adapt the processors 702 to perform some or a totality of features, functions, or operations disclosed herein for one or more of: apparatus 100, including first multiplexer 102, second multiplexer 104, error detector 106; apparatus 200, including logic circuit 202; or apparatus 600, including dual-edge error detector 602, controller 604, and controlled-oscillator 606.

The processors 702 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein.

A general-purpose computer including a processor is considered a special-purpose computer while the general-purpose computer executes, or is configured to execute, functional elements corresponding to the machine-executable code 708 (e.g., software code, firmware code, hardware descriptions) related to examples of the present disclosure. It is noted that a general-purpose processor (may also be referred to herein as a host processor or simply a host) may be a microprocessor, but in the alternative, the processors 702 may include any conventional processor, controller, microcontroller, or state machine. The processors 702 may also be implemented as a combination of computing devices, such as a combination of a DSP and a microprocessor, a plurality of microprocessors, one or more microprocessors in conjunction with a DSP core, or any other such configuration.

In some examples the storage 706 includes volatile data storage (e.g., random-access memory (RAM)), non-volatile data storage (e.g., Flash memory, a hard disc drive, a solid state drive, erasable programmable read-only memory (EPROM), without limitation). In some examples the processors 702 and the storage 706 may be implemented into a single device (e.g., a semiconductor device product, a system on chip (SOC), without limitation). In some examples the processors 702 and the storage 706 may be implemented into separate devices.

In some examples the machine-executable code 708 may include computer-readable instructions (e.g., software code, firmware code). By way of non-limiting example, the computer-readable instructions may be stored by the storage 706, accessed directly by the processors 702, and executed by the processors 702 using at least the logic circuit 704. Also by way of non-limiting example, the computer-readable instructions may be stored on the storage 706, transferred to a memory device (not shown) for execution, and executed by the processors 702 using at least the logic circuit 704. Accordingly, in some examples the logic circuit 704 includes electrically configurable logic circuit 704.

In some examples the machine-executable code 708 may describe hardware (e.g., circuitry) to be implemented in the logic circuit 704 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG®, SYSTEMVERILOG™ or very large scale integration (VLSI) hardware description language (VHDL) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuit 704 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 708 may include an HDL, an RTL, a GL description, a mask level description, other hardware description, or any combination thereof.

In examples where the machine-executable code 708 includes a hardware description (at any level of abstraction), a system (not shown, but including the storage 706) may implement the hardware description described by the machine-executable code 708. By way of non-limiting example, the processors 702 may include a programmable logic device (e.g., an FPGA or a PLC) and the logic circuit 704 may be electrically controlled to implement circuitry corresponding to the hardware description into the logic circuit 704. Also by way of non-limiting example, the logic circuit 704 may include hard-wired logic manufactured by a manufacturing system (not shown, but including the storage 706) according to the hardware description of the machine-executable code 708.

Regardless of whether the machine-executable code 708 includes computer-readable instructions or a hardware description, the logic circuit 704 is adapted to perform the functional elements described by the machine-executable code 708 when implementing the functional elements of the machine-executable code 708. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations that perform the actions of the module or component and/or software objects or software routines that may be stored on and/or executed by general purpose hardware (e.g., computer-readable media, processing devices, without limitation) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means "some or a totality." As used herein, the term "each and every" means a "totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more," without limitation); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations, without limitation). Furthermore, in those instances where a convention analogous to "at least one of A, B, and C, without limitation" or "one or more of A, B, and C, without limitation" is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples include:

Example 1: An apparatus, comprising: an error detector; a first multiplexer including: an output coupled to a first input of the error detector; a non-inverting input and an inverting input respectively to receive a first clock signal; and a select input to receive a control signal, and a second multiplexer including: an output coupled to a second input of the error detector; a non-inverting input and an inverting input respectively to receive a second clock signal; and a select input to receive the control signal.

Example 2: The apparatus according to Example 1, comprising: a logic circuit to receive a reset signal of the error detector and generate the control signal at least partially responsive to the reset signal of the error detector.

Example 3: The apparatus according to one or more of Examples 1 and 2, wherein the logic circuit to generate the control signal to alternately select respective non-inverting inputs or respective inverting inputs of the first multiplexer and the second multiplexer at least partially responsive to assertions of the reset signal.

Example 4: The apparatus according to one or more of Examples 1 to 3, wherein the error detector to assert the reset signal at least partially responsive to like respective edges of the first clock signal and the second clock signal.

Example 5: The apparatus according to one or more of Examples 1 to 4, wherein the first clock signal and the second clock signal are different.

Example 6: The apparatus according to one or more of Examples 1 to 5, wherein the error detector is a single error detector.

Example 7: A system, comprising: a controlled-oscillator to generate an output clock signal; a dual-edge error detection circuit to indicate a difference between a reference clock signal and the output clock signal, wherein the dual-edge error detection circuit to reuse an error detector to detect rising and falling edges of the reference clock signal and the output clock signal; and a controller to generate control signals to reduce the difference between the reference clock signal and the output clock signal indicated by the dual-edge error detector.

Example 8: a system according to Example 7, wherein the dual-edge error detection circuit comprising: an error detector; a first multiplexer including: a non-inverting input and an inverting input respectively coupled to receive a reference clock signal; an output coupled to a first input of the phase frequency detector; and a select input coupled to receive a control signal, and a second multiplexer including: a non-inverting input and an inverting input respectively coupled to receive a feedback clock signal generated by the clock-tracking circuit to track the reference clock signal; an output coupled to a second input of the error detector; and a select input coupled to receive the control signal. The error detector is a single error detector.

Example 9: The system according to Examples 7 or 8, wherein one of the first input or the second input of the error detection circuit is a reference input and the other one of the first input or the second input of the error detection circuit is a feedback input.

Example 10: The system according to one or more of Examples 7 to 9, wherein an output of the error detection circuit is coupled to an input of a controller of the clock-tracking circuit, the controller to control a controlled oscillator of the clock-tracking circuit.

Example 11: A method, comprising: receiving a first clock signal and a second clock signal; and generating, via a single error detector being triggered at least partially responsive to like respective edges of the first clock signal and the second clock signal, an error signal that represents a phase difference between the first clock signal and the second clock signal.

Example 12: The method according to Example 11, comprising: selecting, at least partially responsive to a first assertion of a reset signal of the error detector, a non-inverting input of a first multiplexer having an output coupled to a first input of the error detector; selecting, at least partially responsive to the first assertion of the reset signal of the error detector, a non-inverting input of a second multiplexer having an output coupled to a second input of the error detector; selecting, at least partially responsive to a second assertion of the reset signal of the error detector, an inverting input of the first multiplexer having the output coupled to the first input of the error detector; and selecting, at least partially responsive to the second assertion of the reset signal of the error detector, an inverting input of the second multiplexer having the output coupled to the second input of the error detector.

Example 13: The method according to Examples 11 or 12, wherein the like respective edges of the first clock signal and the second clock signal are respective rising edges or falling edges of the first clock signal and the second clock signal.

Example 14: The method according to one or more of Examples 11 to 13, wherein the generating the error signal comprises: generating an UP signal and a DOWN signal that represents the phase difference between the first clock signal and the second clock signal.

Example 15: The method according to one or more of Examples 11 to 14, wherein one of the first clock signal or the second clock signal is a reference clock signal, and the other one of the first clock signal or the second clock signal is a feedback clock signal generated by a clock-tracking circuit to track the reference clock signal.

Example 16: The method according to one or more of Examples 11 to 15, wherein the single error detector being triggered at least partially responsive to like respective edges of the first clock signal and the second clock signal comprises: the single error detector being triggered at least partially responsive to a totality of like respective edges of the first clock signal and the second clock signal.

Example 17: The method according to one or more of Examples 11 to 16, wherein the single error detector is a single error detector.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
   an error detector;
   a first multiplexer including:
      an output coupled to a first input of the error detector;
      a non-inverting input and an inverting input respectively to receive a first clock signal; and
      a select input to receive a control signal;
   a second multiplexer including:
      an output coupled to a second input of the error detector;
      a non-inverting input and an inverting input respectively to receive a second clock signal; and
      a select input to receive the control signal; and
   a logic circuit separate from the error detector, the logic circuit to:
      receive a reset signal of the error detector;
      detect a predetermined reset event at least partially based on the reset signal; and
      generate the control signal at least partially responsive to the detected reset event.

2. The apparatus of claim 1, wherein the logic circuit to generate the control signal to alternately select respective non-inverting inputs or respective inverting inputs of the first multiplexer and the second multiplexer at least partially responsive to assertions of the reset signal.

3. The apparatus of claim 1, wherein the error detector to assert the reset signal at least partially responsive to like respective edges of the first clock signal and the second clock signal.

4. The apparatus of claim 1, wherein the first clock signal and the second clock signal are different.

5. The apparatus of claim 1, wherein the error detector is a single error detector.

6. A system, comprising:
   a controlled-oscillator to generate an output clock signal;
   a dual-edge error detection circuit to indicate a difference between a reference clock signal and the output clock signal, wherein the dual-edge error detection circuit to:
      reuse an error detector to detect rising and falling edges of the reference clock signal and the output clock signal; and
      use a logic circuit separate from the error detector to select a polarity of the reference clock signal and a polarity of the output clock signal fed to the error detector, the logic circuit to:

receive a reset signal output by the error detector;
detect a predetermined reset event indicated by the reset signal, and
generate a signal to control selection of the polarity of the reference clock signal and the polarity of the output clock signal at least partially responsive to the detected reset event; and
a controller to generate control signals to reduce the difference between the reference clock signal and the output clock signal indicated by the dual-edge error detection circuit.

7. The system of claim 6, wherein the dual-edge error detection circuit comprises:
the error detector;
a first multiplexer comprising:
a non-inverting input and an inverting input respectively coupled to receive a reference clock signal;
an output coupled to a first input of a phase frequency detector; and
a select input coupled to receive a control signal, and
a second multiplexer comprising:
a non-inverting input and an inverting input respectively coupled to receive a feedback clock signal generated by the clock-tracking circuit to track the reference clock signal;
an output coupled to a second input of an error detector; and
a select input coupled to receive the control signal.

8. The system of claim 7, wherein one of the first input or the second input of an error detection circuit is a reference input and the other one of the first input or the second input of the error detection circuit is a feedback input.

9. The system of claim 6, wherein the controller includes integral control and proportional control.

10. A method, comprising:
receiving a first clock signal and a second clock signal;
generating, via a single error detector being triggered at least partially responsive to like respective edges of the first clock signal and the second clock signal, an error signal that represents a phase difference between the first clock signal and the second clock signal;
detecting, via a logic circuit separate from the error detector, a predetermined reset event indicated by a reset signal output by the error detector; and
generating a control signal for selecting a polarity of the first clock signal and a polarity of the second clock signal to be fed to the single error detector at least partially responsive to the detected reset event.

11. The method of claim 10, comprising:
selecting, at least partially responsive to a first assertion of a reset signal of the error detector, a non-inverting input of a first multiplexer having an output coupled to a first input of the error detector;
selecting, at least partially responsive to the first assertion of the reset signal of the error detector, a non-inverting input of a second multiplexer having an output coupled to a second input of the error detector;
selecting, at least partially responsive to a second assertion of the reset signal of the error detector, an inverting input of the first multiplexer having the output coupled to the first input of the error detector; and
selecting, at least partially responsive to the second assertion of the reset signal of the error detector, an inverting input of the second multiplexer having the output coupled to the second input of the error detector.

12. The method of claim 10, wherein the like respective edges of the first clock signal and the second clock signal are respective rising edges or falling edges of the first clock signal and the second clock signal.

13. The method of claim 10, wherein the generating the error signal comprises:
generating an UP signal and a DOWN signal that represents the phase difference between the first clock signal and the second clock signal.

14. The method of claim 10, wherein one of the first clock signal or the second clock signal is a reference clock signal, and the other one of the first clock signal or the second clock signal is a feedback clock signal generated by a clock-tracking circuit to track the reference clock signal.

15. The method of claim 10, wherein the single error detector being triggered at least partially responsive to like respective edges of the first clock signal and the second clock signal comprises:
a single error detector being triggered at least partially responsive to a totality of like respective edges of the first clock signal and the second clock signal.

16. The method of claim 10, wherein the single error detector is a single error detector.

* * * * *

UNITED STATES PATENT AND TRADEMARK OFFICE
CERTIFICATE OF CORRECTION

PATENT NO. : 12,449,834 B2  
APPLICATION NO. : 18/333827  
DATED : October 21, 2025  
INVENTOR(S) : Youcef Fouzar et al.

Page 1 of 1

It is certified that error appears in the above-identified patent and that said Letters Patent is hereby corrected as shown below:

In the Claims

Claim 7, Column 19, Line 24, change "by the clock-tracking" to --by a clock-tracking--

Signed and Sealed this  
Twenty-seventh Day of January, 2026

John A. Squires  
*Director of the United States Patent and Trademark Office*